United States Patent
Feigl et al.

(10) Patent No.: US 9,458,822 B2
(45) Date of Patent: Oct. 4, 2016

(54) ROTOR FOR A WIND TURBINE

(75) Inventors: Luca Feigl, Barcelona (ES); José Luis Román Mallada, Sant Just Desvern (ES); Ricardo Lázaro, Barcelona (ES)

(73) Assignee: ALSTOM RENOVABLES ESPAÑA, S.L., Barcelona (ES)

( * ) Notice: Subject to any disclaimer, the term of this patent is extended or adjusted under 35 U.S.C. 154(b) by 448 days.

(21) Appl. No.: 14/233,737

(22) PCT Filed: Aug. 1, 2012

(86) PCT No.: PCT/EP2012/065042
§ 371 (c)(1),
(2), (4) Date: Jan. 17, 2014

(87) PCT Pub. No.: WO2013/017623
PCT Pub. Date: Feb. 7, 2013

(65) Prior Publication Data
US 2014/0127028 A1    May 8, 2014

Related U.S. Application Data

(60) Provisional application No. 61/542,477, filed on Oct. 3, 2011.

(30) Foreign Application Priority Data

Aug. 2, 2011 (EP) ..................................... 11382264

(51) Int. Cl.
*F03D 1/06* (2006.01)

(52) U.S. Cl.
CPC ................ *F03D 1/06* (2013.01); *F03D 1/0658* (2013.01); *Y02E 10/721* (2013.01)

(58) Field of Classification Search
CPC ...... F03D 1/06; F03D 1/0658; Y02E 10/721
USPC .................................. 416/204 R, 222, 223 R
See application file for complete search history.

(56) References Cited

U.S. PATENT DOCUMENTS 2,110,783 A      3/1938   Welker
4,360,288 A  *  11/1982   Rutledge, Jr. ........... E21B 17/00
                                                                  174/176

(Continued)

FOREIGN PATENT DOCUMENTS

EP    1 398 499    3/2004
EP    1 486 415    12/2004

(Continued)

OTHER PUBLICATIONS

International Search Report for PCT/EP2012/065042, mailed Nov. 23, 2012, 12 pgs.

*Primary Examiner* — Hoang Nguyen
(74) *Attorney, Agent, or Firm* — Squire Patton Boggs (US) LLP

(57) ABSTRACT

It includes a rotatable hub carrying blades and a device for attaching a portion of the blades to a portion of the hub. The attaching device includes bushings inside of which corresponding studs can be secured. At least some of the bushings are provided with at least one securing end adapted for providing the stud with a degree of rotation relative to the bushing. Bushings may include an inner receiving member for receiving a corresponding end of the stud. The receiving member can be rotated inside the bushing around an axis.

9 Claims, 3 Drawing Sheets

(56) References Cited

U.S. PATENT DOCUMENTS

| | | |
|---|---|---|
| 4,773,824 A | 9/1988 | Kiss |
| 4,915,590 A | 4/1990 | Eckland et al. |
| 5,413,374 A | 5/1995 | Pierce |
| 5,458,465 A * | 10/1995 | von Wieser ............. F04D 29/38 416/214 R |
| 6,371,730 B1 * | 4/2002 | Wobben ................ F03D 1/0658 416/204 R |
| 6,537,031 B1 * | 3/2003 | Bacskay ................. B63H 1/20 416/207 |
| 7,517,194 B2 | 4/2009 | Doorenspleet et al. |
| 2007/0065288 A1 | 3/2007 | Sorensen et al. |
| 2007/0231146 A1 | 10/2007 | Birkemeyer et al. |
| 2008/0218006 A1 * | 9/2008 | Dimascio ................ F16C 19/28 310/425 |
| 2009/0263250 A1 | 10/2009 | Quell et al. |
| 2009/0324420 A1 | 12/2009 | Arocena De La Rua et al. |

FOREIGN PATENT DOCUMENTS

| | | |
|---|---|---|
| EP | 2 078 851 | 7/2009 |
| EP | 2 187 069 | 5/2010 |
| WO | WO 01/42647 | 6/2001 |
| WO | WO 2010/041008 | 4/2010 |

* cited by examiner

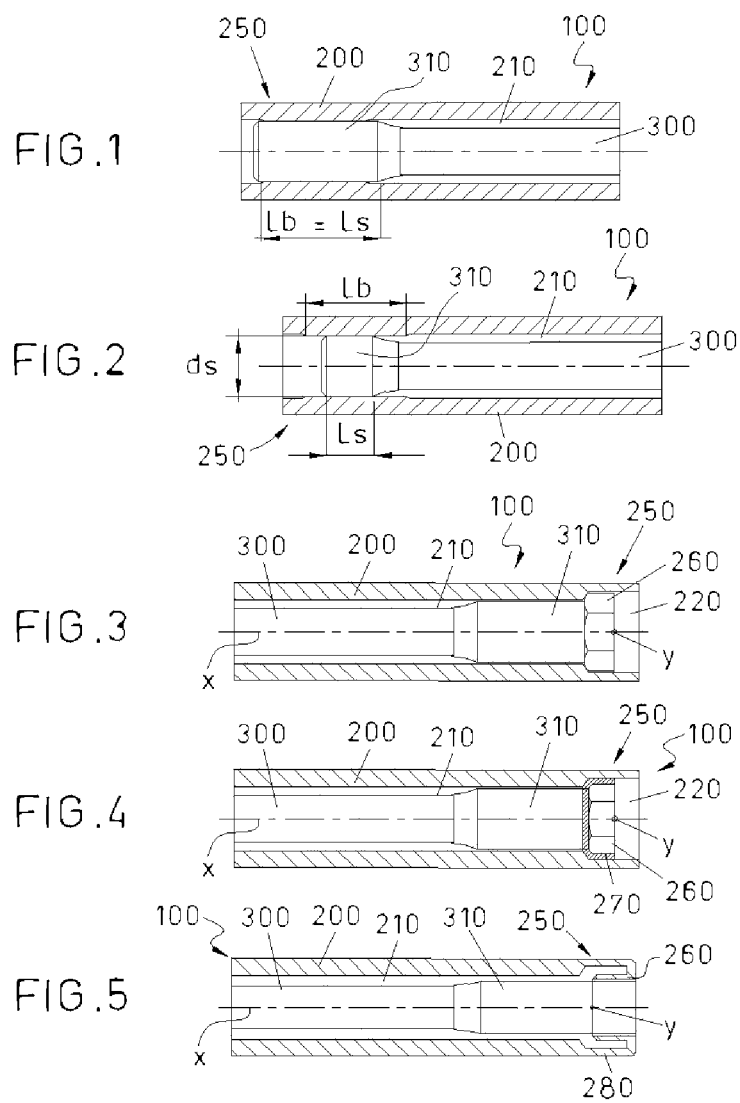

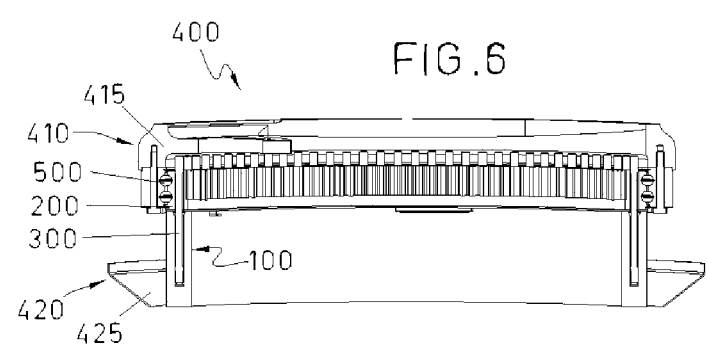
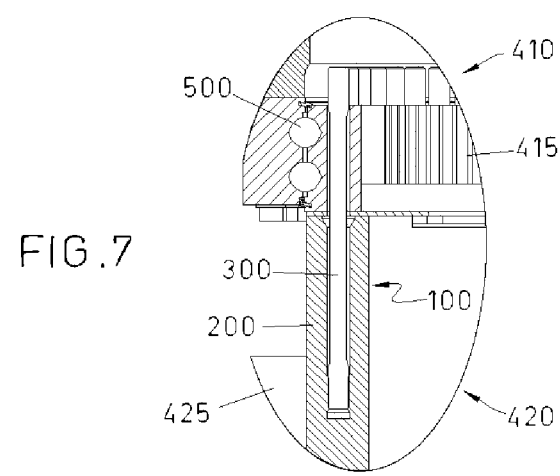

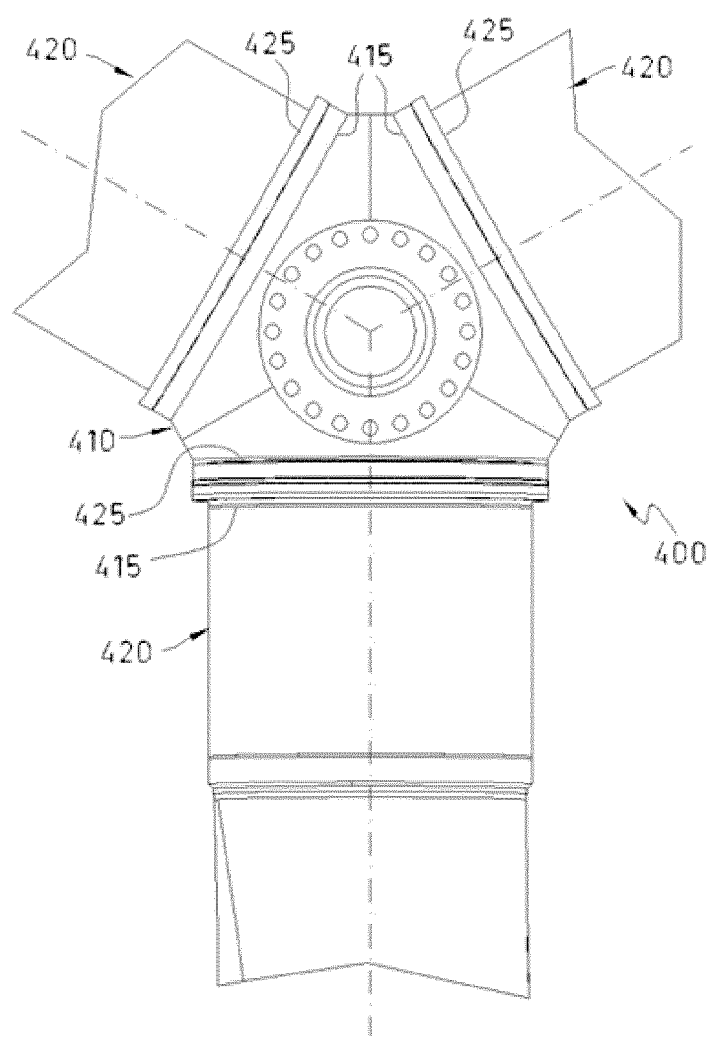

ROTOR FOR A WIND TURBINE

This application claims the benefit of European Patent Application EP 11382264.7 filed Aug. 2, 2011 and U.S. Provisional Patent Application Ser. No. 61/542,477 filed Oct. 3, 2011.

TECHNICAL FIELD

A blade and hub connection in a wind turbine rotor are disclosed herein. More particularly this invention relates to a rotor for a wind turbine in which said blade and hub are connected and to a wind turbine as it will discloses herein.

BACKGROUND

Rotors in wind turbines are formed with parts that are exposed in operation to strong centrifugal forces, rotational forces as well as other forces such as gravity and those arising from the action of the wind on the blades. The hub and the blades connected thereto are exposed to strong forces and therefore they become severely stressed, especially when in use. Strong forces involved in wind turbine rotors are a serious problem which in most cases give rise to fatigue failure of the attaching means used for blade and hub connection. The parts in a wind turbine rotor, and particularly the blade hub connection, must be therefore of heavy construction. This results in undesirably heavy, large, and expensive parts.

As it is known, wind turbine blades are releasably attached, through their respective blade root portions, to the rotor hub through the use of attaching means. The attaching means include a plurality of bushings and corresponding studs arranged in a portion of the hub and in a portion of the blade root. Studs are threadably received into the bushings for releasable connection of the blades to the hub.

Fatigue failure of studs in wind turbine applications is known, specifically of their securing ends. Such failure is known to be caused by bending stresses (radial forces) and tensile stresses (longitudinal or axial forces) acting on the blade and hub connection.

All forces acting on the blades, that is, both axial forces along the axis of the blades and bending forces to the axis of the blades, result in a pulling force applied on each stud. Since the blades are usually attached to the rotor hub through a bearing by means of screws and the screws of the blades usually do not coaxially correspond to those of the hub, said pulling force gives rise to a bending force on the assembly. Such bending force depends on the above mentioned pulling force and it is a varying force such that additional bending fatigue damages are caused to the studs.

Attempts to provide an effective solution for accommodating high damaging forces on the blades have been proposed in the art. One example is providing the ends of the bushings with spherical bearings as disclosed in U.S. Pat. No. 4,773,824. The rotor of the wind turbine shown in this document includes a rotatable hub carrying a number of blades and attaching means for blade connection to the hub. The attaching means include connecting rods having threaded opposite ends screwed into corresponding ends of the bushings. Between the connecting rod and the bushing a space is defined. The ends of the bushings have respective cup bearings having spherical faces in order to absorb centrifugal forces of the blades.

Although this solution deals with the problem of absorption of centrifugal forces when in use, this is carried out through the provision of bearings which operates with bushing and stud as a whole. Therefore no provision us made for an efficient accommodation of high bending stresses acting on the wind turbine rotor.

US2007065288 discloses a releasable attachment of a wind turbine blade portion to a wind turbine hub by means of bushings embedded into the blade portion. The internal thread of the bushings may extend over the entire length or at least one portion of the bushing has no thread. Therefore, the stud introduced into the bushing and engaged in the thread may be put under tension.

Although according to this solution the blade portion can be connected to the hub independent of the cyclic loads acting on the blade, it however does not face the problem of how to efficiently absorbing the centrifugal forces of the blades on the hub, particularly critical bending stresses resulting from said forces acting on the blade and hub connection.

In general, in the prior art solutions the bushing thread is substantially as long as the stud thread or in some cases shorter. Bushing and stud thread lengths are substantially the same such that a rigid bushing-stud connection is created. Therefore the studs are retained against any bending and axial directions. As used herein, a bending direction stands for any direction where studs can be bent or flexed, such as a radial direction, a tangential direction, and the like, relative to the axis of the stud. On the other hand, an axial direction stands for a direction substantially along the axis of the stud.

Such attaching means provide for a good stiffness for the tensile stresses. However, theses attaching means do not provide for an efficient bending stress accommodation. This is a serious drawback in situations in which bending stresses are higher than tensile stresses and especially when such bending stresses are applied at different times due to the high speed gusts of wind combined with rotation of the blades themselves resulting in fatigue damage.

SUMMARY

A non-rigid coupling for some parts of a wind turbine rotor is disclosed herein, particularly for a blade portion and a hub portion in a wind turbine rotor. Through the present non-rigid coupling high centrifugal forces acting on the hub, particularly the resulting bending stresses, can be efficiently accommodated such that damage can be at least significantly reduced.

A typical wind turbine rotor includes a rotatable hub, one or more pairs of blades arranged about the hub and an attaching device for releasably attaching or connecting a portion (e.g. an end portion) of a blade a portion of the hub in the wind turbine.

Within the present disclosure, a portion of a blade is to be understood as any portion of the blade, such as an end portion of the blade, including the blade root. A portion of the blade may even also refer to a blade root extender if it is provided. As it is known, a blade root extender is usually coupled to the blade root and to the hub and it is used to increase the rotor diameter of the wind turbine for higher power production.

The above mentioned attaching device includes a number of bushings. Bushings are hollow pieces, usually made of metal such as steel, that are embedded in the end surface of blade root. Bushings are adapted, i.e. sized and shaped, for receiving corresponding studs to be secured therein. Studs are pieces that are also made of metal such as steel. In general, the material of the bushing has the same mechanical strength than that of the stud.

Studs can be, for example, bars at least one end of which is externally threaded such that it can be screwed into one internally threaded end of the corresponding bushing.

The studs are usually securely fixed a hub portion such as through screws or the like.

However, other technically equivalent embodiments of the attaching device are conceivable such as for example those in which the studs are embedded in the end surface of the blade root and the bushings are embedded in a hub portion of the wind turbine rotor.

According to the present wind turbine rotor, at least some of the bushings are provided with at least one securing end that is adapted for providing the stud a degree of rotation relative to the bushing into which it is secured. Within the meaning of this disclosure, a degree of rotation should be interpreted as angular displacement of the order of a fraction of a degree.

This degree of rotation that the stud is allowed to perform under bending stress results in a non-rigid coupling of the blade portion to the hub portion that is capable of efficiently accommodating high centrifugal forces acting on the hub and therefore at least reducing damages to the wind turbine rotor and more particularly to the blades-hub bolted joint.

In some embodiments of the present wind turbine rotor, the at least one securing end of the bushing may include an inner receiving member. This inner receiving member is suitably adapted for receiving a corresponding end of the stud. The inner receiving member is provided inside the bushing and it can be integrally formed with the bushing. The inner receiving member may be provided with a through hole having an inner thread adapted for threadably receiving a corresponding threaded end of the stud.

The inner receiving member may be for example a nut member. This nut member may be suitably adapted for being rotated inside the bushing, that is, it can be angularly moved around an axis that is substantially perpendicular to the longitudinal axis of the bushing. Therefore, when the stud is screwed into the corresponding bushing, the nut member and stud assembly is allowed to be slightly rotated around said axis substantially perpendicular to the longitudinal axis of the bushing. The slight angular movement of the nut member and stud assembly relative to the bushing results in an efficient bending stress absorption by the attaching device.

A length of the securing end of the bushing may be provided with an internal thread for threadably receiving an external thread formed in a length of the corresponding stud. It is preferred that the bushing thread length is larger than the stud thread length. This reduces stress concentration on the threads while providing a good axial strength. This contrasts with prior art blade hub connections in which the bushing thread length is shorter than the stud thread length.

It is preferred that the bushing thread length is larger than or equal to 0.8 times the metric thread diameter of the stud and shorter than 2 times the metric thread diameter of the stud. This ratio of the bushing metric thread length to the stud metric thread diameter is an optimum ratio that provides the lowest stud restrain. However, in a still most preferred embodiment of the wind turbine rotor, the bushing thread is larger than or equal to 0.8 times the metric thread diameter of the stud and shorter than 1.5 times the metric thread diameter of the stud.

The above ratio can be alternatively referred to a common bushing-stud thread length. A common bushing-stud thread length can be defined as the contact length of the threads both of the bushing and the stud screwed thereon. Said common thread length depends on the material of both the blade portion and the hub portion.

In preferred embodiments, the internal thread of the bushing may be entirely surrounded by the external thread of the stud when the stud is operatively fitted into the hub and more particularly the external thread of the stud is centred lengthwise to the internal thread of the bushing when the stud is operatively fitted into the hub. These relative positions of the bushing and stud threads allow to at least reduce stress accumulation on the ends of the stud threads.

According to the present solution it is preferred that the common thread length is larger than or equal to 0.8 times the metric thread diameter of the stud and shorter than 2 times the metric thread diameter of the stud. This contrasts again with prior art bushing and stud connections where the common thread length, the bushing thread length and the stud thread length are substantially the same.

The provision of bushings having at least one securing end adapted for providing the stud with a certain degree of rotation provides a non-rigid coupling. Non-rigid coupling has been proven to be very effective in accommodating the high centrifugal forces of the blades on the hub, particularly the bending stresses resulting from said forces. This non-rigid solution helps to significantly reduce fatigue from bending stress even in cases where damage caused by bending stress can reach up to 80% of the total fatigue damage.

The bending moments transmitted to the stud thread are consequently highly reduced in a way that the studs mainly work under traction. This results in that the wind turbine rotor can be provided with studs having a smaller diameter resulting in a decrease in the cost of the blade, pitch system and hub.

A wind turbine is also herein provided including a nacelle supported by a tower, and a rotor having a rotatable hub, at least one pair of blades arranged about said hub and attaching device for attaching a portion of the blades to a portion of the hub as described above.

Additional objects, advantages and features of embodiments of the present rotor for a wind turbine will become apparent to those skilled in the art upon examination of the description, or may be learned by practice thereof.

BRIEF DESCRIPTION OF THE DRAWINGS

Particular embodiments of the present rotor for a wind turbine will be described in the following by way of non-limiting examples, with reference to the appended drawings, in which:

FIG. 1 is a sectional fragmentary view of an end portion of a bushing into which a stud end is inserted according to a common prior art wind turbine rotor;

FIG. 2 is a sectional fragmentary view of an end portion of a bushing into which a stud end is inserted according to a first embodiment;

FIGS. 3, 4 and 5 are sectional fragmentary views of an end portion of a bushing into which a stud end is inserted according to a second embodiment;

FIG. 6 is a fragmentary view of a portion of one embodiment of the wind turbine rotor;

FIG. 7 is a detail view of an enlarged portion of FIG. 6; and

FIG. 8 is an elevational part view of a wind turbine rotor.

DETAILED DESCRIPTION OF EMBODIMENTS

One example of a rotor for a common wind turbine has been indicated as a whole at 400 in FIGS. 6-8 of the drawings. Rotor 400 mainly includes a rotatable hub 410 carrying a number of blades 420. In the particular embodiment in FIG. 8, the rotor has three blades 420 attached to the hub 410.

In the following disclosure reference is made generally to the connection between a blade portion 425 and a hub portion 415 in the wind turbine rotor 400. Both the blade and the hub portions 425, 415 should be interpreted broadly. The blade portion 425 may be any portion of the blade 420 in the wind turbine rotor 400. For example, blade portion 425 may be any end portion of the blade 420 such as the blade root as shown in the examples of the figures. Blade portion 425 may also refer to any element associated with the blade 420 such as a blade extender. Blade extenders are usually coupled to blade roots to increase blade diameter. Blade portion 425 may even also refer to a track, e.g. an inner track provided in the bearing 500 provided in the blade-hub connecting portion as shown in FIG. 6. On the other hand, the term hub portion 415 may refer, to any portion of the hub 410 as well as any element associated with the hub 410 such as a corresponding track, e.g. an outer track, in said bearing 500 in the blade-hub connecting portion.

One end portion 425 of the blades 420 is releasably connected to one portion 415 of the hub 410 as shown in FIG. 8. This is carried out by an attaching device 100. FIG. 1 illustrates one example of a prior art attaching device 100. The attaching device 100 in FIG. 1 includes a number of bushings 200 (only one shown in FIGS. 1-5). Bushings 200 are metal elongated bodies that are arranged along the surface of the blade portion 425 as shown in FIGS. 6 and 7. More particularly, the bushings 200 are embedded in between a number of layers in the laminate of the blade portion 425 as the blade 420 is usually made of fibre reinforced composites. Bushings 200 have a hollow interior 210 at least one end of which is provided with an inner bushing thread having a determined length Lb.

The bushing hollow interior 210 is adapted for receiving a corresponding threaded bolt or stud 300. Studs 300 are metal elongated pieces having at least one end 310 with an outer stud thread having a determined length Ls as shown in FIGS. 1 and 2 of the drawings.

Although metal bushings 200 and studs 300 are used in the disclosed embodiments, non-metallic bushings e.g. made of high-strength polymers or polymer composites, could be of course used as required. Even in some embodiments, both metallic and non-metallic bushings 200 and studs 300 could be used.

In use, as shown in FIG. 6, the studs 300 are screwed into the corresponding bushings 200 that are provided in the blade portion 425. Under no significant bending stresses, studs 300 are arranged substantially coaxial with bushings 200, that is, with their corresponding longitudinal axes x substantially matching each other.

As shown in FIG. 1, the prior art rigid solution for the attaching device 100 in the blade-hub connection includes said bushing and stud arrangement in which the bushing thread length Lb and the stud thread length Ls are substantially the same (see FIG. 1).

In the embodiment shown in FIG. 2 of the drawings, the attaching device 100 has substantially the same structural configuration with the provision of bushings 200 (only one shown). Bushings 200 are elongated hollow pieces made of metal such as steel and bonded in the end surface of the blade portion 425 such as the blade root in a blade 410 of the wind turbine rotor 400. Bushings 200 each have a hollow interior 210 with an inner bushing thread with a determined length Lb. The bushing hollow interior 210 in the embodiment shown in FIG. 2 is also adapted for receiving a corresponding stud 300 to be secured therein.

Studs 300 are elongated pieces bonded in one portion 425 of the hub 420. Studs 300 have at least one end 310 with an outer stud thread having a determined length Ls. Studs 300 may be made of metal and in general the material of the bushing 200 may have the same strength than that of the stud 300.

As shown in FIG. 2, the embodiment of the attaching device 100 provides a bushing-stud arrangement in which the bushing thread length Lb is different than the stud thread length Ls. More particularly, the bushing thread length Lb is larger than the stud thread length Ls as shown in said FIG. 2 of the drawings.

In the embodiment shown in FIG. 2, the bushing thread length Lb is substantially larger than or equal to 0.8 times the stud metric thread diameter ds and shorter than 1.5 times the stud metric thread diameter ds. The above range [0.8 ds≤ Lb≤1.5 ds] for the bushing thread length Lb is an optimum ratio for both an efficient axial strength and good bending stress absorption. In some cases, the bushing thread length Lb could be up to 2 times the stud metric thread diameter ds.

The common bushing-stud thread length is the contact length of the threads both of the bushing 200 and the stud 300 screwed thereon. As shown in FIG. 2, the stud thread length Ls (and in some cases the bushing thread length Lb too) is shorter than those of the prior art attaching device 100 shown in FIG. 1. Therefore, the common bushing-stud thread length in the embodiment shown in FIG. 2 is also shorter than that of the prior art attaching device 100 shown in FIG. 1.

As a result of the configuration in the embodiment shown in FIG. 2 the bushings 200 have at least one securing end 250 that is suitable for providing the stud 300 a certain degree of rotation relative to the bushing 200 into which it is secured. The fact that the stud 300 can be slightly angularly moved inside the bushing and relative thereto results in a non-rigid coupling of the blade portion 425 to the hub portion 415. Such non-rigid attaching device 100 are advantageously capable of accommodating high centrifugal forces acting on the hub 410 of the wind turbine rotor 400.

In the alternative embodiment shown in the FIGS. 3 and 4, the securing end 250 of the bushing 200 is provided with an inner receiving member. The inner receiving member in the embodiment shown in the FIGS. 3 and 4 of the drawings is a nut member 260. The nut member 260 has a threaded hole adapted for threadably receiving a corresponding threaded end 310 of the stud 300. The nut member 260 is fitted in an enlarged portion 220 formed in the hollow interior 210 of the bushing 200 as shown in FIG. 4. The enlarged portion 220 is shaped such as the nut member 260 fitted therein can not be displaced along the longitudinal axis x of the bushing 200. Therefore, the stud 300 that is screwed into the nut member 260 through the threaded end 310 is not allowed to be displaced axially. The nut member 260 can only be slightly rotated inside the bushing 200 and relative thereto. Rotational movement of the nut member 260 and hence the stud 300 screwed therein is limited by the inner walls of the bushing 200. A radial displacement of the order of a few millimeters is therefore only allowed. Due to the radial tolerance or gap resulting from the diameter differences between the outer surface of the stud 300 and the inner surface of the bushing 200, a hinged connection resulting in a non-rigid coupling is advantageously provided through which bending stresses, i.e. radial stresses, can be efficiently accommodated, especially during wind turbine operation.

More specifically, the nut member 260 is allowed to be slightly rotated, together with the stud 300 screwed therein through its threaded end 310, around an axis y that is substantially perpendicular to the drawing and substantially perpendicular to the longitudinal axis x of the bushing 200, as shown in FIGS. 3 and 4. In these alternative embodiments shown in FIGS. 3 and 4 it is preferred that the outer portion of the nut member 260 is spherical with the purpose of facilitating its radial movement inside the bushing 200.

In the particular embodiment of FIG. 4, a spring device is provided in the securing end 250 of the bushing 200. In this exemplary embodiment, the spring device includes an elastomer element 270. The elastomer element 270 is fitted between the exterior of the nut member 260 and at least one length of the inner walls of the enlarged portion 220 in the hollow interior 210 of the bushing 200. The elastomer element 270 biases the nut member 260 as it is rotated with the stud 300 relative to the bushing 200.

FIG. 5 shows a further embodiment. In this particular embodiment, the bushing 200 is also adapted for providing the stud 300 with a certain degree of rotation around axis y. The inner walls of the bushing 200 extend in the region of securing end 250 into respective thinner wall portions 280 which are somewhat flexible. The thinner wall portions 280 extend in turn inwards inside the bushing 200 to form the inner nut member 260. According to this configuration, the inner nut member 260 is integral with the bushing 200 and it is provided with a threaded hole 290 for receiving a corresponding threaded end 310 of the stud 300. As in the previous embodiments, the nut member 260 is capable of being slightly rotated with the stud 300 screwed therein around axis y into the hollow interior 210 of the bushing 200. As the inner nut member 260 is formed integrally with the bushing 200, the stud 300 that is screwed into the nut member 260 is not allowed to be displaced axially, i. e. along axis x. Rotational movement of the nut member 260 and the stud 300 screwed therein around axis y is limited by the inner walls of the bushing 200. Therefore, a radial displacement of the order of a few millimeters is only allowed as in the other embodiments.

Although only a number of particular embodiments and examples of the present wind turbine rotor have been disclosed herein, it will be understood by those skilled in the art that other alternative embodiments and/or uses as well as obvious modifications and equivalents thereof are possible. For example, in the present embodiment bushings 200 are shown arranged in a portion 425 of the blade and studs 300 are shown arranged in a portion 415 of the hub 410. However, it could be possible to have the bushings 200 arranged in the hub portion 415 and the studs 300 arranged in the blade portion 425 if required.

The present disclosure covers all possible combinations of the particular embodiments described. Thus, the scope of the present disclosure should not be limited by particular embodiments, but should be determined only by a fair reading of the claims that follow.

The invention claimed is:

1. A rotor for a wind turbine, the rotor comprising:
a rotatable hub, at least one pair of blades arranged about the hub, and
an attaching device for attaching a portion of the blades to a portion of the hub, the attaching device including a number of bushings inside of which corresponding studs can be secured, wherein at least some of the bushings are provided with at least one securing end that is adapted for providing the stud with a degree of rotation relative to the bushing into which it is secured.

2. The rotor of claim 1, wherein the securing end of the bushing includes an inner receiving member adapted for receiving a corresponding end of the stud, the receiving member being further adapted for being rotated in the interior the bushing around an axis substantially perpendicular to the longitudinal axis of the bushing.

3. The rotor of claim 2, wherein the receiving member is integrally formed with the bushing.

4. The rotor of claim 1, wherein a spring device is provided between an exterior of a nut member and at least one length of the inner walls of the bushing.

5. The rotor of claim 1, wherein a length of the securing end of the bushing is provided with an internal thread for receiving an external thread of the corresponding stud and a bushing thread length is larger than a stud thread length.

6. The rotor of claim 5, wherein the stud thread length is larger than or equal to 0.8 times the metric thread diameter of the stud and shorter than 2 times the metric thread diameter of the stud.

7. The rotor of claim 5, wherein the internal thread of the bushing is entirely surrounded by the external thread of the stud when the stud is operatively fitted into the hub.

8. A The rotor of claim 5, wherein the external thread of the stud is centred lengthwise to the internal thread of the bushing when the stud is operatively fitted into the hub.

9. A wind turbine comprising:
a nacelle supported by a tower and a rotor, the rotor having a rotatable hub and at least one pair of blades arranged about the hub,
wherein the rotor further includes an attaching device for attaching a portion of the blades to a portion of the hub, the attaching device including a number of bushings inside of which corresponding studs are secured, at least some of the bushings being provided with at least one securing end that is adapted for providing the stud with a degree of rotation relative to the bushing into which it is secured.

* * * * *